United States Patent [19]
Hulcher

[11] 3,847,288
[45] Nov. 12, 1974

[54] WINCH LINE HITCH MEMBER FOR DERAILED CARS AND METHOD OF USING SAME

[75] Inventor: Glenn L. Hulcher, Virden, Ill.
[73] Assignee: M. L. Hulcher Company, Virden, Ill.
[22] Filed: Apr. 18, 1973
[21] Appl. No.: 352,253

[52] U.S. Cl. ............................................... 213/111
[51] Int. Cl. .............................................. B61g 3/00
[58] Field of Search ................................... 213/111

[56] References Cited
UNITED STATES PATENTS
1,095,393   5/1914   Gerlach et al. ..................... 213/111

Primary Examiner—M. Henson Wood, Jr.
Assistant Examiner—Gene A. Church

[57] ABSTRACT

For handling derailed upright railroad cars, a winch line hitch is provided to replace the knuckle on the knuckle pin of the coupler. With two or more winch lines extending at different angles from the hitch, the vector of the resultant pulling force may be changed at will. By pulling the pivoting hitch first at one angle and then another, the car is dislodged and drawn forward. The alternating pulling forces are safely distributed through the coupler to the car structure, to avoid damage to it.

3 Claims, 3 Drawing Figures

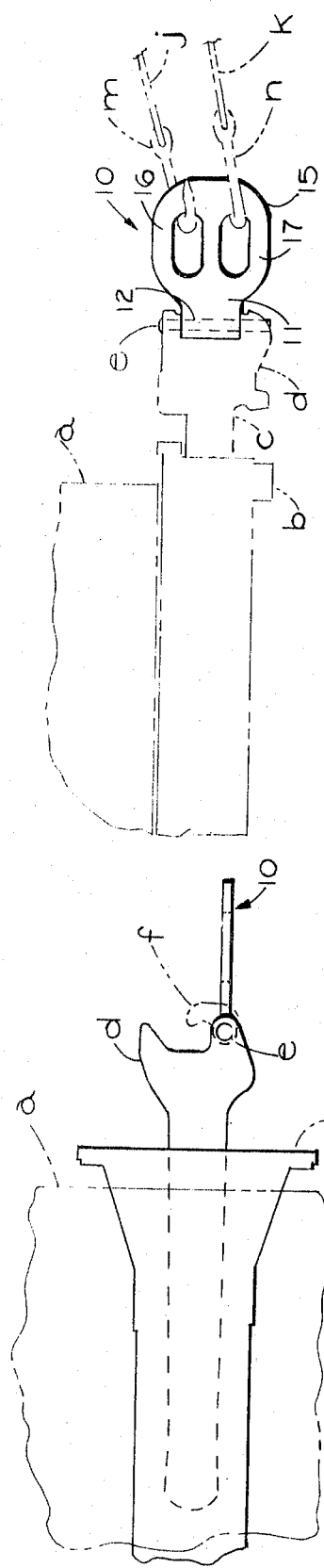
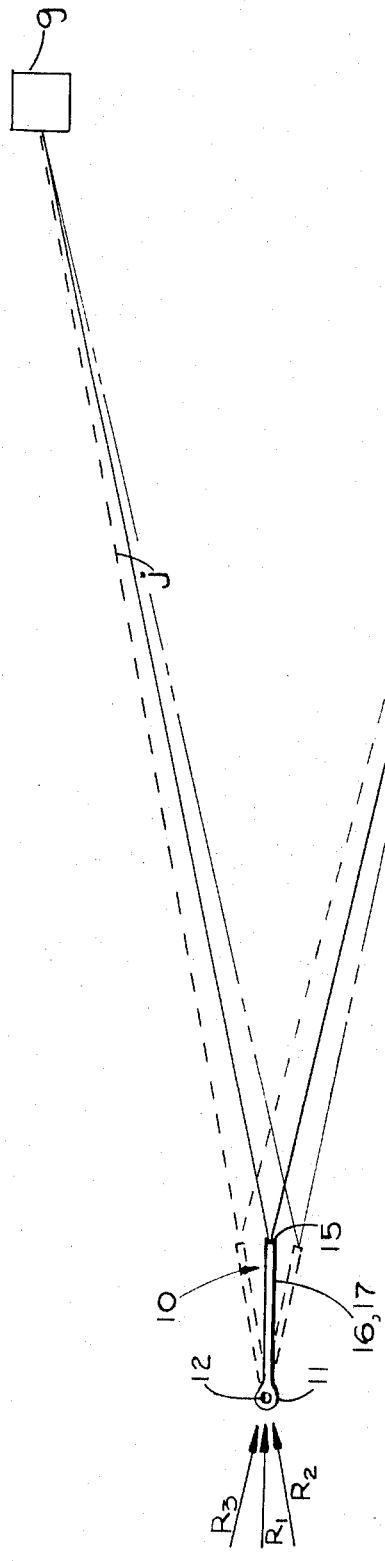

WINCH LINE HITCH MEMBER FOR DERAILED CARS AND METHOD OF USING SAME

BACKGROUND OF THE INVENTION

Derailed railroad cars are difficult to handle, although in upright position. Typically they may be jack-knived in a zig-zag string. When off the tracks, very strong forces are required to move them. To exert such forces at random on portions of the car structure may result in breaking of the cars.

The problem is complicated by the fact that economically the salvage of the contents of the cars may become more important than the cars themselves.

In on-track use, cars are pulled by couplers whose open ends are filled by knuckles which inter-engage to couple cars to each other. Each knuckle is mounted on a vertical pin in the mouth of the coupler. In handling derailed cars, cables have been wrapped around any available portions of the cars, including such couplers and knuckles.

SUMMARY OF THE INVENTION

For exerting safe pulling forces on such derailed cars, when upright, I remove the knuckle from the coupler of the car and substitute in its place on the knuckle pin the rounded lug portion of a rigid metal hitch member whose forward projecting portion has horizontally elongated openings. To these I attach the hooks of two or more winch lines each extending somewhat forwardly at a different angle. By operating the winches, I exert tension forces on the hitch member, whose ratio I change at will. By so doing, I selectively vary the angle of the resultant vector of these winching forces. The hitch member pivots into alignment with such resultant vector, exerting the pulling force on the knuckle pin first at one angle and then at another. The resultant force so exerted is distributed safely by the coupler to the structure of the car. Hence, by exerting the resultant pull at varying angles I can dislodge the car and draw it into position for restoration to the track.

BRIEF DESCRIPTION OF THE DRAWINGS

FIG. 1 is a schematic plan view showing how the hitch member of the present invention is to be installed in a coupler as typically provided at the end of a railroad car.

FIG. 2 is a plan view of the hitch member of the coupler of FIG. 1. Two winch lines are schematically shown as connected to it and used, under the method of the present invention, to apply pulling forces at variable angles, illustrated in solid lines, dashed lines and phantom lines respectively.

FIG. 3 is an elevational view of the present hitch member, mounted in the coupler of a railroad car and with winching hooks attached as shown in phantom lines.

DESCRIPTION OF THE PREFERRED EMBODIMENT

A railroad car generally designated $a$ is conventionally equipped with a sill $b$ installed within car $a$, and having a coupler generally designated $c$ mounted therein. Its projecting jaw-like end $d$ has, in one of its jaw portions offset from the coupler centerline, a vertical bore which receives a knuckle pin $e$. On the pin $e$ is conventionally mounted a knuckle $f$, as shown in FIG. 1, which knuckle extends from the pin $e$ laterally across the centerline of the coupler $c$, to engage the mating knuckle of an adjacent car. The mechanism which would latch the knuckle $f$ in such closed position is not shown.

The winch line attachment fixture of the present invention is a rigid metal hitch member generally designated 10. Before it is installed, the knuckle pin $e$ and the knuckle $f$ of FIG. 1 must be removed from the jaw end $d$ of the coupler $c$.

Referring to FIGS. 2 and 3, the present hitch member 10 comprises an aft end lug portion 11 which is rounded about a vertical axis along which it is provided with a bore 12, which corresponds in size to that of the bore of the removed knuckle $f$. The depth of the lug portion 11 substantially equals the depth provided within the coupler jaw end $d$ for the removed knuckle $f$. The radial extent of the lug portion 11 from its axis is small enough to pivot freely within the coupler jaw end $d$. As seen by comparison of FIGS. 2 and 3, the depth of the aft portion 11 is substantially greater than its thickness; this affords beam strength for transmitting vertical components of load to the knuckle pin $e$.

Forwardly of the lug portion 11 at a distance sufficient to clear the forward part of the jaw end $d$ of the coupler $c$, as seen in FIG. 3 is a vertically enlarged portion referred to as the winch attachment portion 15. As seen in FIG. 2, it is formed about a vertical plane of symmetry, vertically enlarged to near roundness. In a preferred embodiment the winch attachment portion 15 may be approximately 1 inch in thickness and about 18 inches deep; it may project forwardly from the lug portion approximately 18 inches. The lug portion itself may taper in thickness to a 1¾ inch radius about the axis of its bore, which may be 1⅞ inch in diameter. The depth of the lug portion, fitting into the jaw $d$, is approximately 8 inches. The hitch member 10 is preferably made of cast steel or iron, for strength and rigidity.

Extending laterally through the winch attachment portion 15 and across its plane of symmetry are a plurality of winch hook openings 16, 17, displaced above and below a horizontal center line of the hitch member 10 by about 1⅛ inch. The depth of the openings 16, 17 may be approximately 5 inches; their lenght, to the extremes of their rounded ends, may be approximately 10 inch. This provides a cross-section of roughly 1 × 2⅞ inches minimum to withstand winch loads. These dimensions are furnished merely to aid in understanding the proportions which may be used; they are not limiting dimensions.

The hitch member 10, thus proportioned, is sufficiently short so that vertical load components from the winching are transmitted from the hook openings 6, 17 through the winch attachment portion 15 to the lug portion 11. Its mounting on the knuckle pin $e$ within the jaw end $d$ makes the hitch member 10 serve as a short cantilever beam, to react to any vertical components of force.

when an upright derailed car is to be drawn back to the tracks, the steps are first to remove its knuckle pin $e$ and knuckle $f$. The lug portion 11 is then inserted within the jaw $d$ so that its bore 12 is in line with the bore provided for the pin $e$; the pin is then lowered in place to mount the hitch member pivotally, with its enlarged winch attachment portion 15 clearing the jaw $d$.

The preferred method of using the present hitch member 10 is with two or more winching tractors g, h, positioned somewhat forwardly of the car a but at different angles, preferably to both sides of such car a in its derailed position. For simplicity only two tractors g, h, are shown in FIG. 2, but it is understood that three or four may be conveniently used, to apply a greater resultant force and for even greater control of the resultant angle of pull.

Referring to FIG. 3, the winching lines j, k of the tractors g, h respectively end hooks m, n, which are shown inserted into and engaging the upper and lower hook openings 16, 17, respectively, of the winch attachment portion 15. The tractors g, h are shown in FIG. 2 as located at equal distances forward of the car a and spaced equally to opposite sides of center. In such position, if the winching tractors g, h exert equal forces on their lines j, k, the resultant vector $R_1$ will be directly forward and the hitch member 10 will remain centered in the position shown in solid lines in FIG. 2. Thus a direct forward force will be exerted through the member 10 and distributed by the coupler c throughout the structure of the car a, which is designed to resist such loads in distributed fashion without damage. Even though the knuckle pin e is located off center of the coupler, I have found that pulling the car a from such off center location has no adverse effects whatsoever when the car a is not on the rails.

Normally such a direct forward pull will not suffice to dislodge the car a from its derailed position, as in a group of cars which stand in a jack-knived or zig-zag alignment, or where obstacles such as rocks may interfere with a direct forward pull. Thus the normal use of the present invention is to selectively vary the force applied by lines j, k relative to each other, thereby to vary the angle of the resultant vector of force. This is illustrated in FIG. 2.

Referring to the dashed lines thereof, if the force applied by the tractor g is increased relative to that applied by the tractor h, the resultant vector will be directed increasingly toward the tractor g and the hitch member 10 will pivot on the knuckle pin e into alignment with that resultant. In an extreme case, as where the pull on the line k of the tractor h is decreased to an insubstantial part of that on the line j, the resultant $R_2$ will be exerted on the pin e directly toward the tractor g, as shown in dashed lines, and the hitch member 10 will swing into alignment with the resultant $R_2$. This will exert a pull to the left.

If then it is desired to exert a pull to the right, the tension exerted by the tractor g may be lessened and that exerted by the tractor h be increased, so that the resultant force $R_3$ on the pin e will be directed toward the tractor h; in which case the hitch member 10 will swing to the position shown in phantom lines in FIG. 2.

Reversing the intensity of forces exerted by the winching tractors g, h will alternate their pull from left to right, and back. Repeating such alternations of force intensity loosens and dislodges derailed cars as they are dragged forward. Such alternating forces may be controlled by changing the rate of take-up of the winch lines, by forward movement of the winching tractors, or both.

Thus, in the claims which follow, the term "winch" as in "winch lines," "winch hooks," "winch attachment," and "winching force" do not require that powered winches be employed; for similar tension forces may in many instances be applied otherwise, as by forward movement of the tractors g, h.

I claim:

1. For pivotal mounting to the knuckle pin of a derailed railroad car coupler in place of the knuckle normally provided in the forward part of such coupler,
   a winch line attachment fixture comprising
   a rigid metal hitch member having at its aft end
   a lug portion rounded about a vertical axis and whose depth substantially equals the depth provided within such coupler for hinging such knuckle,
   a vertical bore through said lug portion along said axis, the bore having a diameter sufficient to receive such knuckle pin, and
   a winch attachment portion projecting forwardly from said lug portion, whereby to clear the forward part of such coupler,
   said winch attachment portion having, adjacent to said lug portion, a vertical substantially planar portion whose depth is at least equal to the depth of the lug portion and projects forwardly to means to which a plurality of winch lines may be secured to extend divergingly forward,
   whereby, as winching forces are applied in varying intensities, to pivotally maintain said planar portion in continuous alignment with the resultant of the horizontal components of winch line forces, thereby to cause said planar portion to resist the vertical resultant thereof in the manner of a cantilever beam.

2. A winch line attachment fixture as defined in claim 1, wherein
   the means to which such plurality of winch lines may be secured comprise upper and lower horizontally elongated openings extending laterally through said winch attachment portion,
   whereby the lateral components of such diverging forces, applied at said upper and lower openings in varying ratios, aid in loosening such car as such winching forces draw it forward.

3. In handling derailed upright railroad cars,
   the method of exerting forces thereon to dislodge same without damaging such cars, comprising the steps of
   removing the knuckle from the coupler of such a car,
   inserting in its place, pivotally on the knuckle pin thereof, a rigid forward projecting cantilever beam-like hitch member having upper and lower winch line attachment provisions,
   securing to each said upper and lower attachment provision at least one winch line extending somewhat forwardly therefrom, each line at a different angle, and
   exerting varyingly on said upper and lower attachment provisions, winch lines tension forces having selected horizontal and vertical components
   whereby on varying the angle of the resultant vector of the horizontal components of such tension forces, to pivot said cantilever beam-like member into alignment with such resultant vector, to apply the vertical components thereto in the manner of a cantilever beam, and by intermittently varying the ratio of such upper and lower diverging forces to loosen and dislodge the car.

* * * * *